(12) United States Patent
Miyoshi et al.

(10) Patent No.: US 12,291,156 B2
(45) Date of Patent: May 6, 2025

(54) ATTACHMENT STRUCTURE FOR FUNCTIONAL COMPONENT AND INTERIOR MEMBER

(71) Applicant: TS TECH CO., LTD., Saitama (JP)

(72) Inventors: Takako Miyoshi, Tochigi (JP); Yuichiro Hoshi, Tochigi (JP); Jinichi Tanabe, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 161 days.

(21) Appl. No.: 17/912,316

(22) PCT Filed: Mar. 16, 2021

(86) PCT No.: PCT/JP2021/010682
§ 371 (c)(1),
(2) Date: Sep. 16, 2022

(87) PCT Pub. No.: WO2021/187497
PCT Pub. Date: Sep. 23, 2021

(65) Prior Publication Data
US 2023/0158976 A1    May 25, 2023

Related U.S. Application Data

(60) Provisional application No. 62/990,651, filed on Mar. 17, 2020, provisional application No. 63/037,271, filed on Jun. 10, 2020.

(51) Int. Cl.
*B60R 16/03*    (2006.01)

(52) U.S. Cl.
CPC ................. *B60R 16/03* (2013.01)

(58) Field of Classification Search
CPC ....................................... B60R 16/03
See application file for complete search history.

(56) References Cited

U.S. PATENT DOCUMENTS 5,522,704 A * 6/1996 Casteel ............... H01R 25/142
416/246
5,599,086 A * 2/1997 Dutta ....................... B60Q 3/53
296/214
(Continued)

FOREIGN PATENT DOCUMENTS

CN    209692087 U    11/2019
JP    S59-039546 U    3/1984
(Continued)

OTHER PUBLICATIONS

International Search Report mailed on Jun. 8, 2021 for PCT application No. PCT/JP2021/010682.
(Continued)

*Primary Examiner* — Philip F Gabler
(74) *Attorney, Agent, or Firm* — Michael Best & Friedrich LLP

(57) ABSTRACT

Provided is an attachment structure for a functional component capable of easily changing a position while supplying power. An attachment structure for a functional component is the attachment structure for the functional component to be attached to an interior member of a conveyance, including: a rail member provided in the interior member and extending in a predetermined direction; and a power transmission unit provided in the rail member and the functional component includes an engagement member fixed to be slidable on the rail member and a power receiving unit disposed to face the rail member in the engagement member.

17 Claims, 14 Drawing Sheets

(56) References Cited

U.S. PATENT DOCUMENTS

| | | | | |
|---|---|---|---|---|
| 6,059,582 | A * | 5/2000 | Tsai | H01R 25/147 |
| | | | | 439/121 |
| 7,258,555 | B2 * | 8/2007 | Tiesler | B60R 16/03 |
| | | | | 439/121 |
| 8,141,499 | B2 * | 3/2012 | Shoda | H02N 2/021 |
| | | | | 108/143 |
| 9,031,398 | B2 * | 5/2015 | Cheng | H04N 23/51 |
| | | | | 396/59 |
| 9,627,129 | B2 * | 4/2017 | Abe | H02J 50/12 |
| 10,173,571 | B2 * | 1/2019 | Park | F25B 21/04 |
| 10,848,008 | B2 * | 11/2020 | Cho | H02J 50/05 |
| 11,146,019 | B1 * | 10/2021 | Hunnicutt | H01R 25/142 |
| 11,211,822 | B2 * | 12/2021 | Yamamoto | H02J 50/402 |
| 2006/0209531 | A1 | 9/2006 | Tiesler et al. | |
| 2008/0093830 | A1 | 4/2008 | Takezawa et al. | |
| 2014/0361633 | A1 | 12/2014 | Abe | |
| 2015/0255992 | A1 | 9/2015 | Abe et al. | |
| 2016/0339822 | A1 | 11/2016 | Park et al. | |
| 2020/0139851 | A1 | 5/2020 | Oshima et al. | |

FOREIGN PATENT DOCUMENTS

| | | |
|---|---|---|
| JP | H11-198741 A | 7/1999 |
| JP | 2009-241746 A | 10/2009 |
| JP | 2010-240045 A | 10/2010 |
| JP | 2012-019880 A | 2/2012 |
| JP | 2014-090631 A | 5/2014 |
| JP | 2015-074374 A | 4/2015 |
| JP | 2015-104252 A | 6/2015 |
| JP | 2016-068854 A | 5/2016 |
| JP | 2018-188137 A | 11/2018 |
| JP | 2019-182087 A | 10/2019 |
| WO | 2006/028206 A1 | 3/2006 |

OTHER PUBLICATIONS

Japanese Office Action mailed on Dec. 17, 2024 from the Japan Patent Office (JPO) for the related Japanese Patent Application No. 2022-508387, with English machine translation.

Chinese Office Action dated Mar. 15, 2025 from the China National Intellectual Property Administration (CNIPA) for the corresponding Chinese Patent Application No. 202180022181.6, with English machine translation.

* cited by examiner

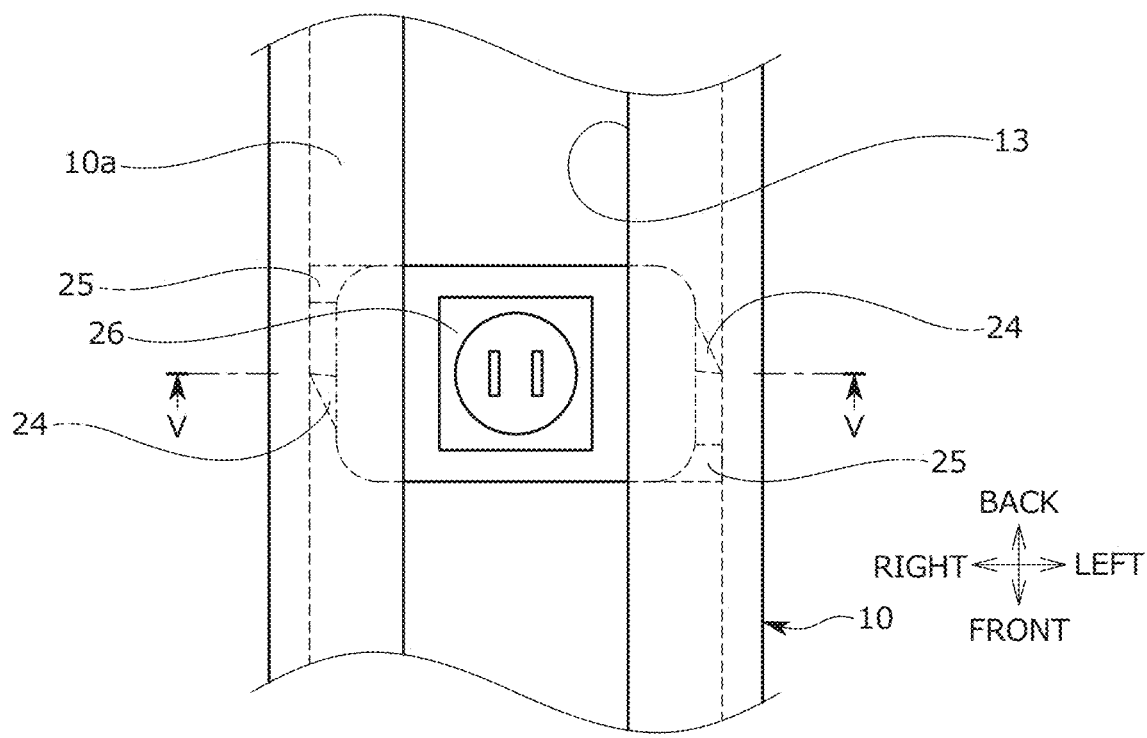

ATTACHMENT STRUCTURE FOR FUNCTIONAL COMPONENT AND INTERIOR MEMBER

CROSS-REFERENCE TO RELATED APPLICATIONS

This application is a National Entry application of PCT Application Serial Number PCT/JP2021/010682, filed Mar. 16, 2021. Further, this application claims priority from U.S. Provisional Patent Application Ser. No. 62/990,651, filed Mar. 17, 2020, and U.S. Provisional Patent Application Ser. No. 63/037,271, filed on Jun. 10, 2020, the entire contents of which are hereby incorporated by reference into this application.

TECHNICAL FIELD

The present invention relates to an attachment structure for a functional component and an interior member and particularly to a structure for attaching a functional component to an interior member for a conveyance and an interior member having the structure.

BACKGROUND ART

Patent Literature 1 discloses a structure in which a locking portion of a functional component such as a lamp device or a speaker is locked to a hole edge of a through-hole of an interior member so that a conductive portion on the side of the interior member contacts a conductive portion on the side of the functional component and the conductive portion on the side of the interior member is electrically connected to the functional component.

CITATION LIST

Patent Literature

PATENT LITERATURE 1: JP 2019-182087 A

SUMMARY OF INVENTION

Technical Problem

In the attachment structure described in Patent Literature 1, since the functional component is fixed to the interior member, it is difficult to move the functional component and change the arrangement thereof.

On the other hand, it is required to form a more comfortable space even in a conveyance interior and to develop a structure capable of easily changing a position of a functional component such as a lamp or a speaker according to the position of an occupant or the purpose of use.

The present invention has been made in view of the above-described circumstances and an object thereof is to provide an attachment structure for a functional component capable of easily changing a position while supplying power and an interior member.

Solution to Problem

The above-described problems are solved by an attachment structure for a functional component to be attached to an interior member of a conveyance includes: a rail member that is provided in the interior member and extends in a predetermined direction; and a power transmission unit which is provided in the rail member, wherein the functional component includes an engagement member that is fixed to be slidable on the rail member and a power receiving unit which is disposed to face the rail member in the engagement member.

Since the functional component includes the engagement member that is fixed to be slidable on the rail member with the power transmission unit and includes the power receiving unit, it is possible to easily change the position of the functional component while supplying power thereto.

Further, in the attachment structure for the functional component, the power transmission unit may serve as a power transmission coil and the power receiving unit may serve as a power receiving coil to supply power in a non-contact state.

Since power can be supplied in a non-contact state, the functional component can be fixed at an arbitrary position of the rail member. Further, since the electrode is not exposed, waterproof and antifouling can be achieved.

In the attachment structure for the functional component, a slit may be formed in the extension direction of the rail member, and the functional component may be attached to the rail member when the engagement member is inserted into the slit and is rotated.

Since the engagement member is rotated in the slit and is attached to the rail member, the functional component can be attached more firmly.

In the attachment structure for the functional component, a locking piece may be provided at a side portion of the engagement member to be movable in an inward and outward direction of the engagement member and comes into contact with an inner wall of the rail member when the engagement member is attached to the rail member and is rotated, and when the locking piece comes into contact with the inner wall of the rail member and is pressed toward the inside of the engagement member, the position of the power receiving coil may approach the power transmission coil and a magnetic field may be generated between the power receiving coil and the power transmission coil to supply power.

When the engagement member is rotated and attached, the power receiving coil and the power transmission coil get close to each other and a magnetic field is generated to supply power. Since power is not supplied during the slide and power is supplied when the functional component is fixed, unnecessary power supply can be avoided.

In the attachment structure for the functional component, the functional component may have a module attachment portion provided on the side opposite to the engagement member to attach a module component thereto.

Since the module attachment portion is provided, the module component can be replaced and various functional components can be attached.

In the attachment structure for the functional component, the module component may be a component having a lamp function.

Since the module component is the component having a lamp function, the lamp device can be movably attached to the interior member.

In the attachment structure for the functional component, the module component may be a component having a function of a hot/cold cup holder.

Since the module component is the component having a function of the hot/cold cup holder, the hot/cold cup holder can be movably attached to the interior member.

In the attachment structure for the functional component, the module component may be a component having a speaker function.

Since the module component is the component having a speaker function, the speaker can be movably attached to the interior member.

In the attachment structure for the functional component, the interior member may be a door trim.

Since the interior member is the door trim, the functional component can be movably attached to the door trim.

In the attachment structure for the functional component, the interior member may be a seat.

Since the interior member is the seat, the functional component can be movably attached to the seat.

Further, the above-described problems are solved by an interior member with the attachment structure for the functional component.

An interior member with a functional component capable of easily changing a position while supplying power is provided.

Advantageous Effects of Invention

According to the attachment structure for the functional component and the interior member of the present invention, since the functional component includes the engagement member that is fixed to be slidable on the rail member with the power transmission unit and includes the power receiving unit, it is possible to easily change the position of the functional component while supplying power thereto.

Further, since power can be supplied in a non-contact state, the functional component can be fixed at an arbitrary position of the rail member. Further, since the electrode is not exposed, waterproof and antifouling can be achieved.

Further, since the engagement member is rotated in the slit and is attached to the rail member, the functional component can be attached more firmly.

Further, when the engagement member is rotated and attached, the power receiving coil and the power transmission coil get close to each other and a magnetic field is generated to supply power. Since power is not supplied during the slide and power is supplied when the functional component is fixed, unnecessary power supply can be avoided.

Further, since the module attachment portion is provided, the module component can be replaced and various functional components can be attached.

Further, since the module component is the component having a lamp function, the lamp device can be movably attached to the interior member.

Further, since the module component is the component having a function of the hot/cold cup holder, the hot/cold cup holder can be movably attached to the interior member.

Further, since the module component is the component having a speaker function, the speaker can be movably attached to the interior member.

Further, since the interior member is the door trim, the functional component can be movably attached to the door trim.

Further, since the interior member is the seat, the functional component can be movably attached to the seat.

Further, an interior member with a functional component capable of easily changing a position while supplying power is provided by the interior member including the attachment structure for the functional component.

BRIEF DESCRIPTION OF DRAWINGS

FIG. 5A is a plan view showing a rail member and an engagement member after rotation.

DESCRIPTION OF EMBODIMENTS

An attachment structure for a functional component according to an embodiment of the present invention will be described with reference to the drawings.

However, the embodiments described below are for facilitating the understanding of the present invention and do not limit the present invention. That is, the present invention can be modified and improved without departing from the gist thereof, and it goes without saying that the present invention includes an equivalent thereof.

Further, in the following description, the contents relating to the material, shape, and size of the components constituting the interior member and the functional component are merely specific examples and do not limit the present invention.

Hereinafter, a door lining provided on a vehicle door D will be given as an example of an interior member for a conveyance, and an attachment structure for a functional component provided on the door lining will be described. However, the present invention is not limited to the door lining for vehicles mounted on a ground-based conveyance having wheels such as automobiles or railroads, but can be applied to, for example, a vehicle door lining mounted on an aircraft or a ship moving outside the ground.

Additionally, in the following description, it is assumed that a rail member 10 provided in a door lining 1 extends in a direction parallel to a floor surface of the vehicle. Further, in the following description, it is assumed that an extension direction of the rail member 10 is an X axis, a gravity applying direction is a Y axis, and an axial direction perpendicular to the door lining is a Z axis. The X-axis direction may be referred to as the front to back direction, the Y-axis direction may be referred to as the up and down direction, and the Z-axis direction may be referred to as the width direction. Additionally, the rail member 10 may not extend in a direction parallel to the floor surface, but may extend in a direction (that is, the Y-axis direction) perpendicular to the floor surface. Further, the rail member 10 may not have a linear shape, but may have, for example, a curved shape. In the case of the curved shape, the extension direction of the rail member 10 is the tangential direction of the curve formed by the rail member 10 at a certain point of the rail member 10.

<Vehicle Door>

Figure 1:
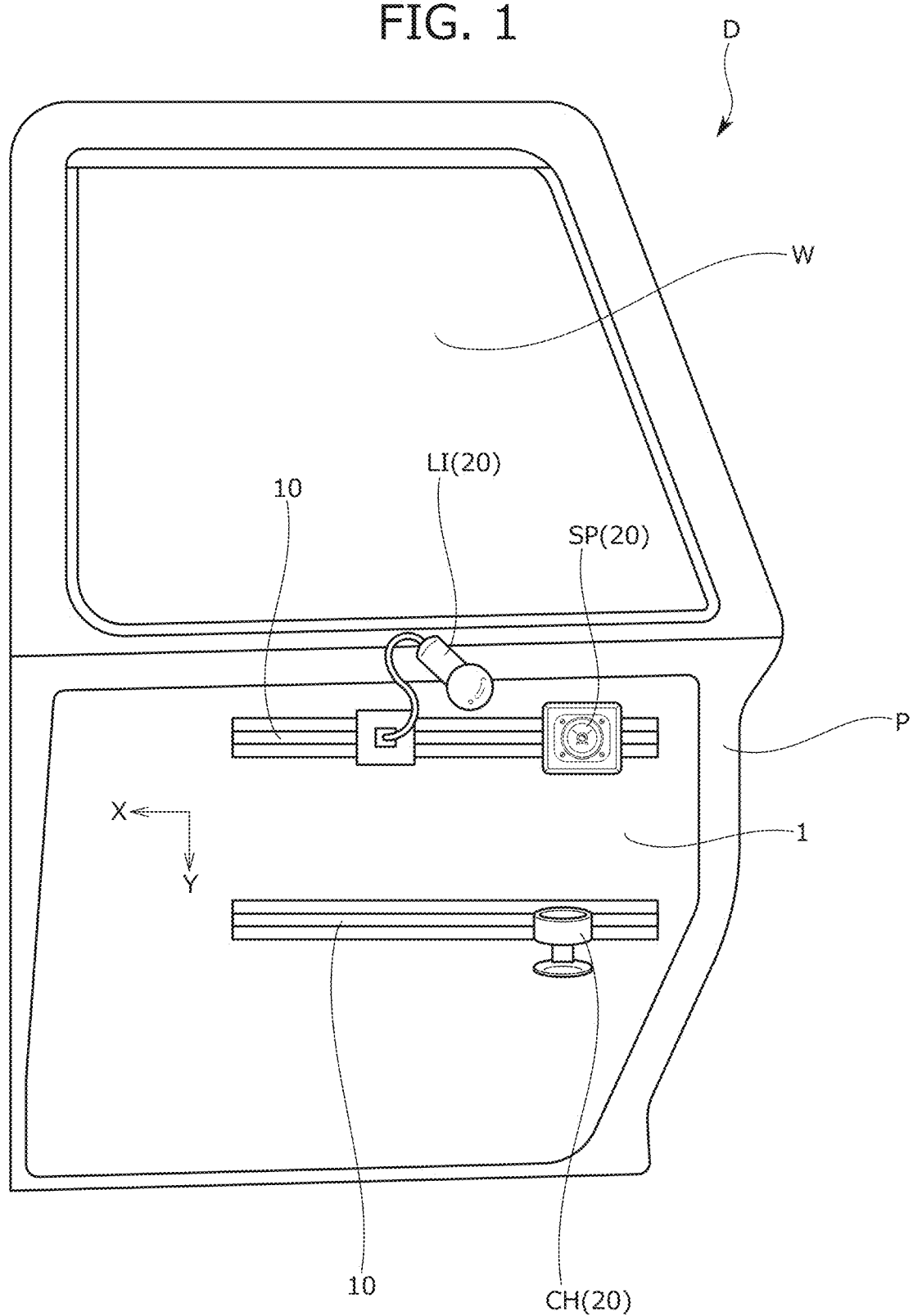
FIG. 1 is a side view of a door having an attachment structure for a functional component according to an embodiment.

A basic configuration of the vehicle door D including the door lining 1 will be described with reference to FIG. 1. FIG. 1 is a side view showing the door lining 1 provided on the vehicle door D. The vehicle door D includes a door panel P, a window W formed on the upper portion of the door panel P, and the door lining 1 provided below the window W in the door panel P.

<Functional Component>

The door lining 1 is provided with two rail members 10. In this embodiment, two rail members 10 are provided to extend in a horizontal direction with respect to a floor surface of a vehicle V in a parallel state. A lamp device LI and a speaker SP are attached to the rail member 10 provided on the upper side of the door lining 1 as a functional component 20. A hot/cold cup holder CH is provided on the rail member 10 provided on the lower side as the functional component 20. The hot/cold cup holder CH is a device that keeps a drink held in the holder warm or cold by using electricity. The functional component 20 is not limited to a device that uses electricity, and may be, for example, a table TB.

Further, the functional component 20 attached to the rail member 10 is replaceable, and for example, the speaker SP and the lamp device LI may be attached to the lower rail member 10. Further, two or more functional components 20 may be attached to the rail member 10.

The functional component 20 is fixed to be slidable on the rail member 10 while receiving power. An attachment structure for attaching the functional component 20 to the rail member 10 will be described with reference to FIGS. 2 to 5.

In the following description, for convenience, the X-axis direction may be referred to as the front to back direction, the Y-axis direction may be referred to as the right and left direction, and the Z-axis direction may be referred to as the up and down direction.

Figure 2:
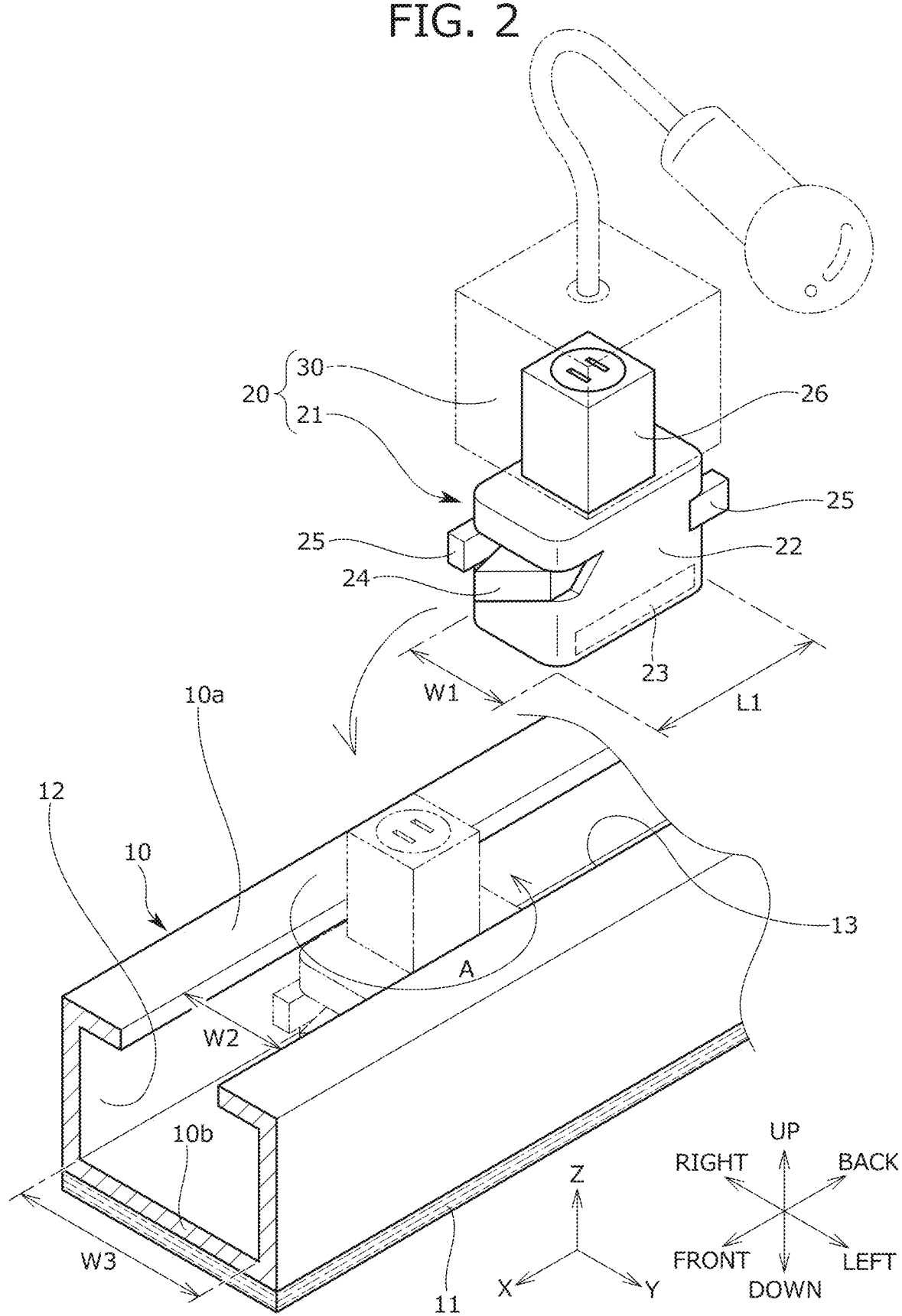
FIG. 2 is a perspective view showing a rail member and an engagement member before insertion.
Figure 3:
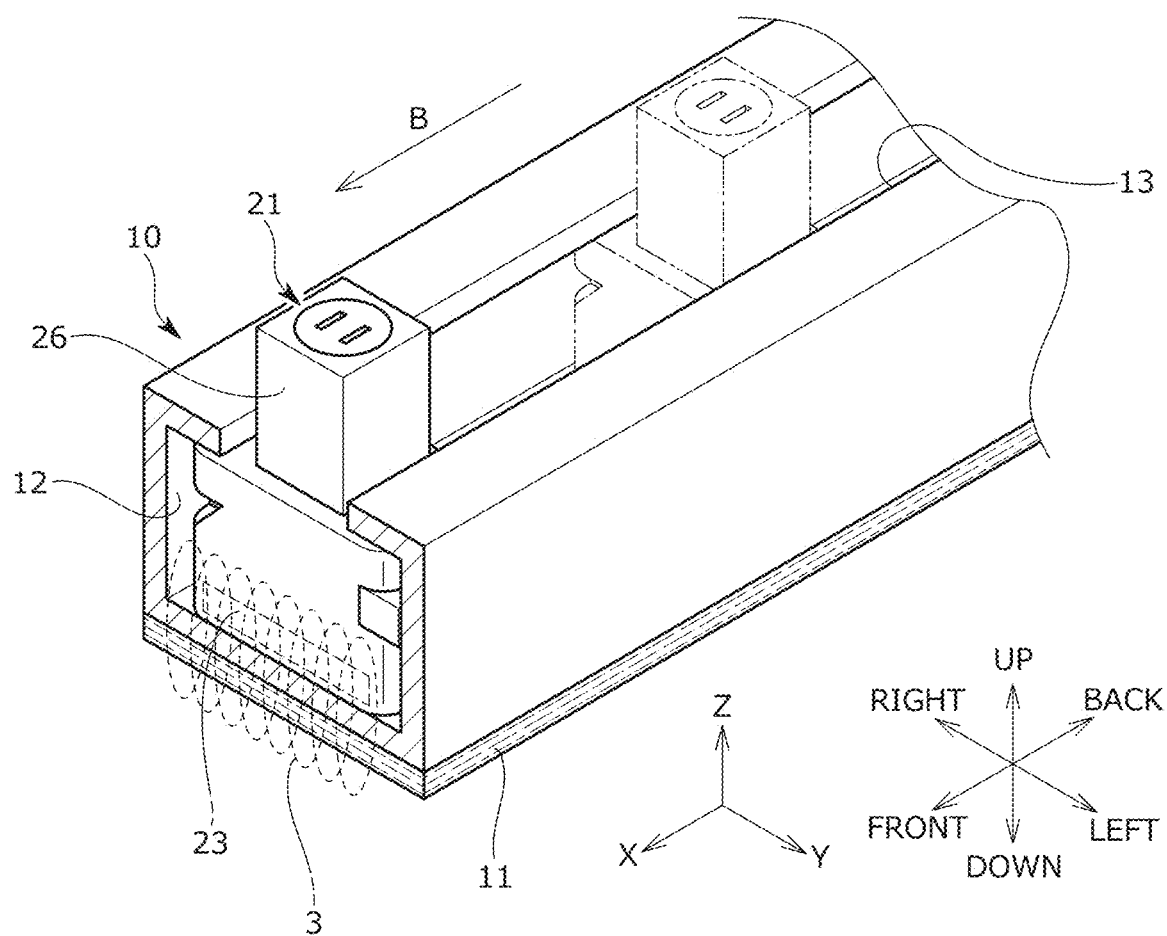
FIG. 3 is a perspective view showing a rail member and an engagement member after attachment.

FIG. 2 is a perspective view showing a part of the rail member 10 and an engagement member 21 attached to the rail member 10 and shows a state in which the engagement member 21 is removed.

The rail member 10 has a C-shaped cross-section and has a T-shaped cavity. In FIG. 2, a slit 13 is provided on an upper surface 10a (a vehicle interior side surface installed on the door lining). The slit 13 is formed along the extension direction of the rail member 10. A power transmission coil 11 which is a power transmission unit is provided on a lower surface 10b (a door lining side surface installed on the door lining 1) of the rail member 10. The power transmission coil 11 is connected to a battery of the vehicle and can supply power.

The engagement member 21 is a member having a T-shaped cross-section constituting the functional component 20 and the functional component 20 is obtained by attaching a module component 30 having functions of a lamp and a speaker to the engagement member 21. A power receiving coil 23 which is a power receiving unit of the present invention is provided at the lower portion of the engagement member 21. The power receiving coil 23 is disposed to face the power transmission coil when the engagement member 21 is inserted into the rail member 10.

When the power receiving coil 23 approaches the power transmission coil 11 of the rail member 10 while facing the power transmission coil 11, a magnetic field 3 is generated and the engagement member 21 can receive power in a non-contact state due to magnetic field resonance.

The width W1 (the length in the Y direction) of the engagement member body 22 of the engagement member 21 is formed to be smaller than the width W2 of the slit 13 of the rail member 10. Therefore, the engagement member 21 can be inserted into the rail member 10 from the slit 13 in the state shown in FIG. 2.

On the other hand, the length L1 (the length in the X direction in FIGS. 2 and 4A) of the engagement member body 22 of the engagement member 21 is formed to be larger than the width W2 of the slit 13. Further, the length is formed to be smaller than the width W3 between side walls 12 of the rail member 10. Therefore, when the engagement member 21 is inserted into the rail member 10 and is rotated by 90°, the engagement member 21 can be attached to the rail member 10.

The engagement member 21 of this embodiment is provided with a pair of locking pieces 24 and support portions 25 that project from the inside to the outside (inward and outward direction). When the engagement member 21 is rotated by 90° after insertion, the locking piece 24 and the support portion 25 come into contact with the inner surface of the side wall 12 of the rail member 10 and fix the engagement member 21 while the engagement member 21 is rotated. At the time of removing the engagement member 21, the engagement member 21 is rotated by 90° to separate the front end of the support portion 25 from the side wall 12. Accordingly, since the fixing is released, the engagement member 21 can be pulled out from the slit 13.

Figure 4A:
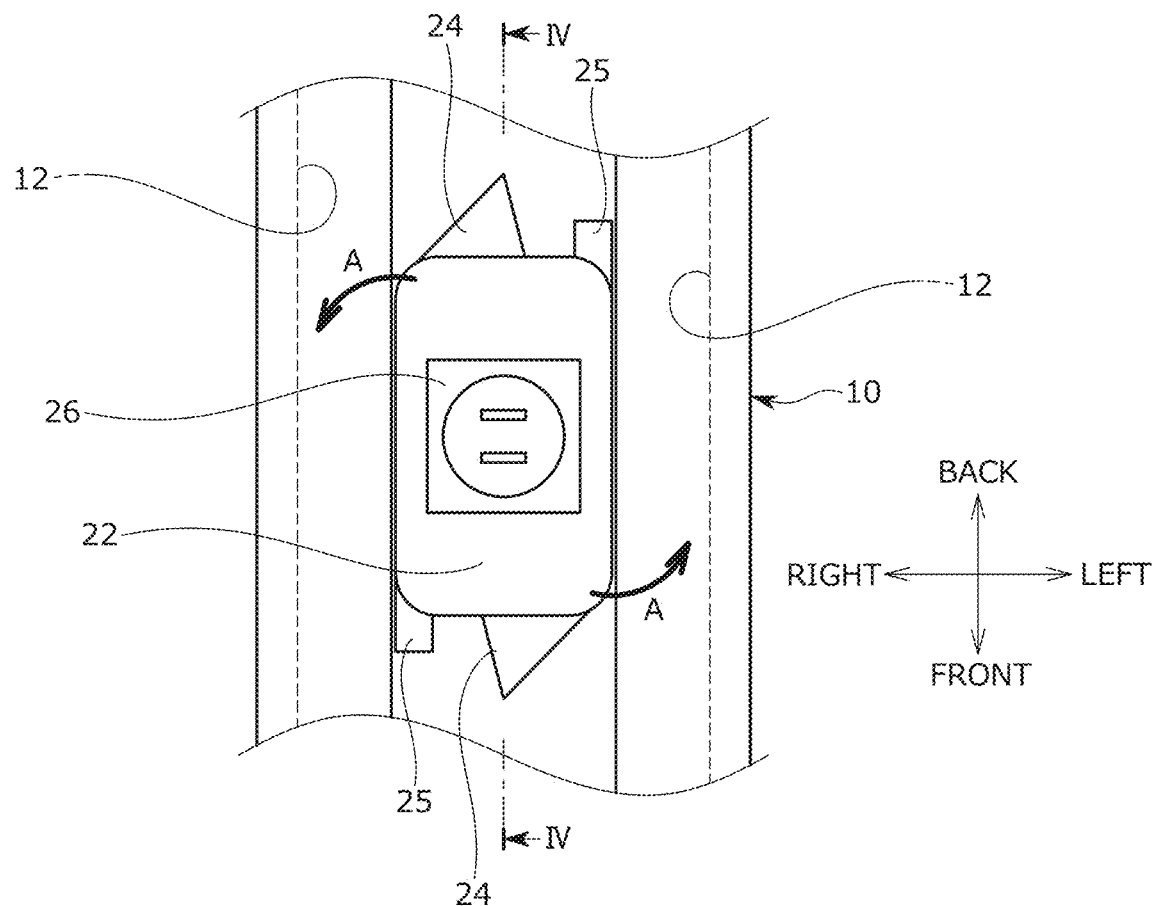
FIG. 4A is a plan view showing a rail member and an engagement member before rotation.
Figure 4B:
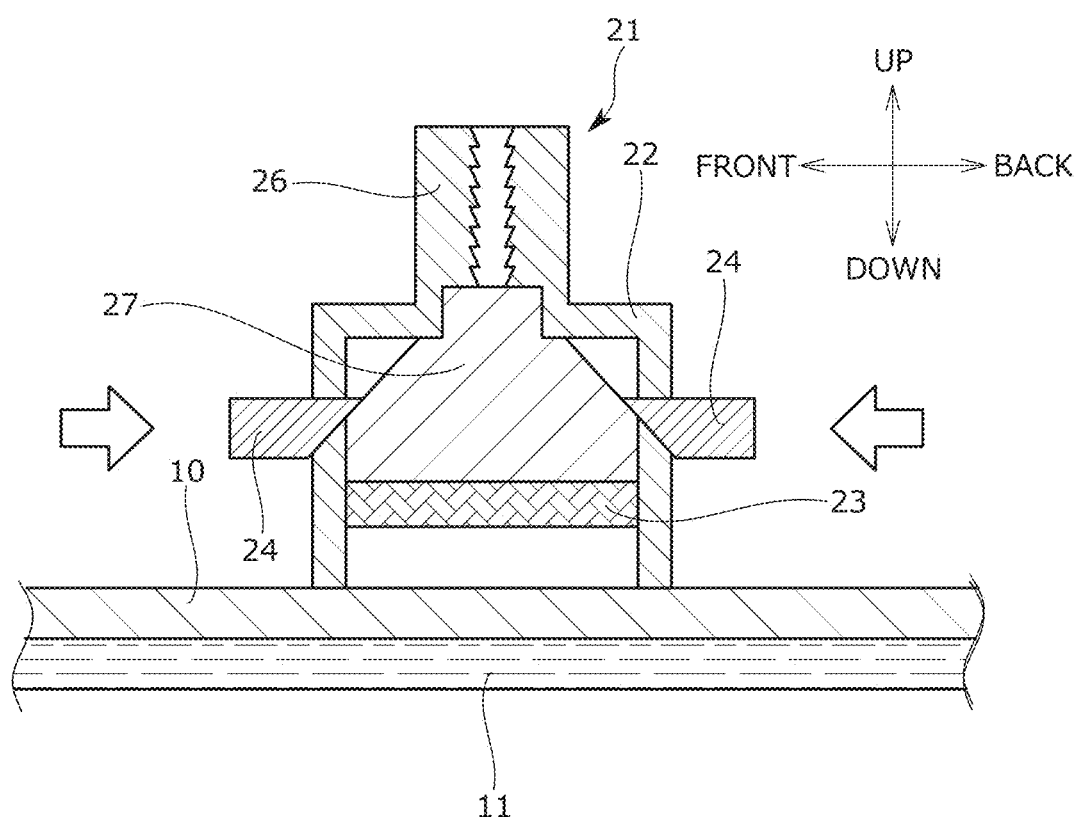
FIG. 4B is a cross-sectional view taken along a line IV-IV of FIG. 4A.
Figure 5B:
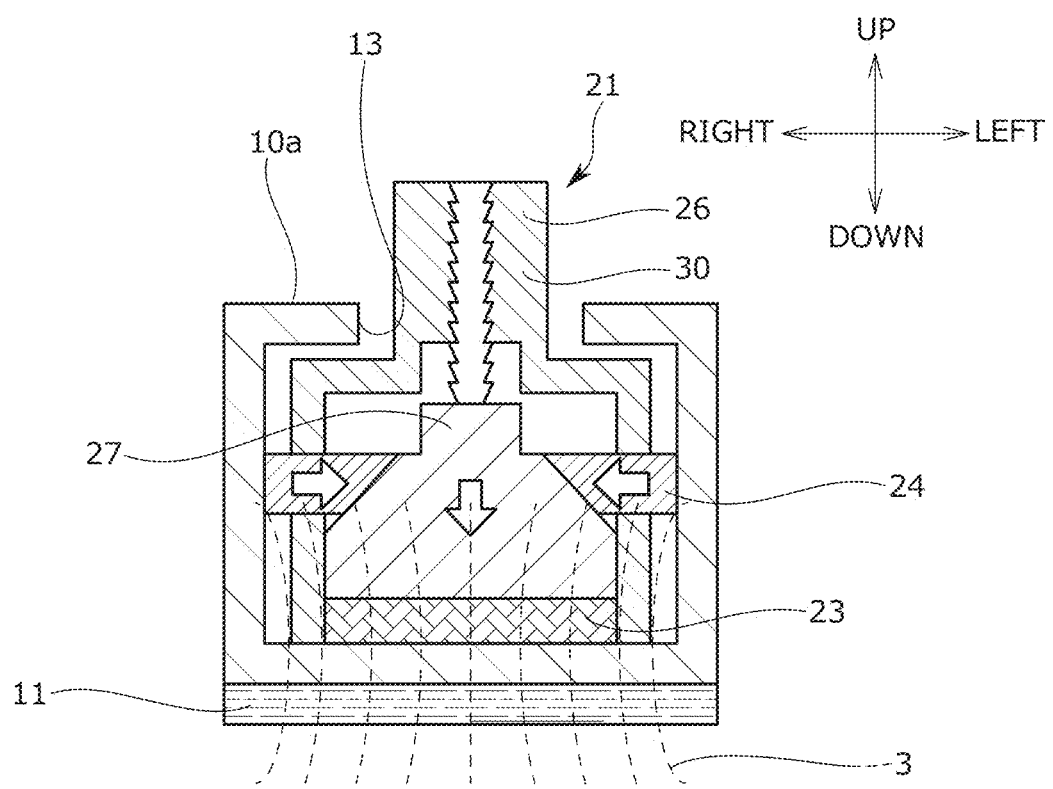
FIG. 5B is a cross-sectional view taken along a line V-V of FIG. 5A.

Further, a movable portion 27 which has the power receiving coil 23 on the lower surface side and is movable in the up and down direction (Z-axis direction) is provided inside the engagement member 21. As shown in FIG. 4B, an inclined surface is formed on a side portion of the movable portion 27 and an inner end portion of the locking piece 24 comes into contact with the inclined surface. Then, when the engagement member 21 is inserted into the rail member 10 and is rotated by 90°, an outer end portion of the locking piece 24 comes into contact with an inner surface of the side wall 12 and hence the locking piece 24 is pressed into the engagement member 21. When the locking piece 24 is pressed inward, the movable portion 27 is moved downward by the inner end portion. When the movable portion 27 moves downward, the power receiving coil 23 provided on a bottom surface moves closer to the power transmission coil 11 provided on the lower surface of the rail member 10. When the power receiving coil 23 moves closer to a power receiving distance, the magnetic field 3 is generated between the power transmission coil 11 and the power receiving coil 23 and the engagement member 21 can receive power in a non-contact state due to the magnetic field resonance. The locking piece 24 is locked in a pressed state and a state in which power can be supplied to the engagement member 21 is maintained.

Since the engagement member 21 receives power in a non-contact state, power flows to the module component attached to the engagement member 21 and hence each function can be accomplished.

Since power is supplied in a non-contact state, noise and wear associated with the contact between the engagement member 21 and the rail member 10 and dust due to the wear are reduced and hence troubles due to connection can be suppressed.

Since the electrodes are not exposed at the connection portion between the engagement member 21 and the rail member 10, waterproofing and antifouling can be achieved.

An end portion on the side opposite to the power receiving coil of the engagement member 21 is provided with a module attachment portion 26 to which a module component is attached. The shape of the module attachment portion 26 may be a standard shape or a special shape. As the module components, as described above, there are those having a speaker function, those having a lamp function, and those having a function of a hot/cold cup holder. The functional component 20 is obtained by attaching the module component to the engagement member 21.

Since the engagement member 21 having the module component attached thereto is slidably attached to the rail member 10 provided in the interior member such as a door trim by such an attachment structure, it is possible to easily change the position of the functional component while supplying power to the functional component.

Hereinafter, the vehicle V having the attachment structure for the functional component of the present invention will be described with reference to the drawings.

By moving the functional component according to the arrangement of the seat S provided in the vehicle V, the vehicle interior can be used as a more comfortable space.

Figure 6A:
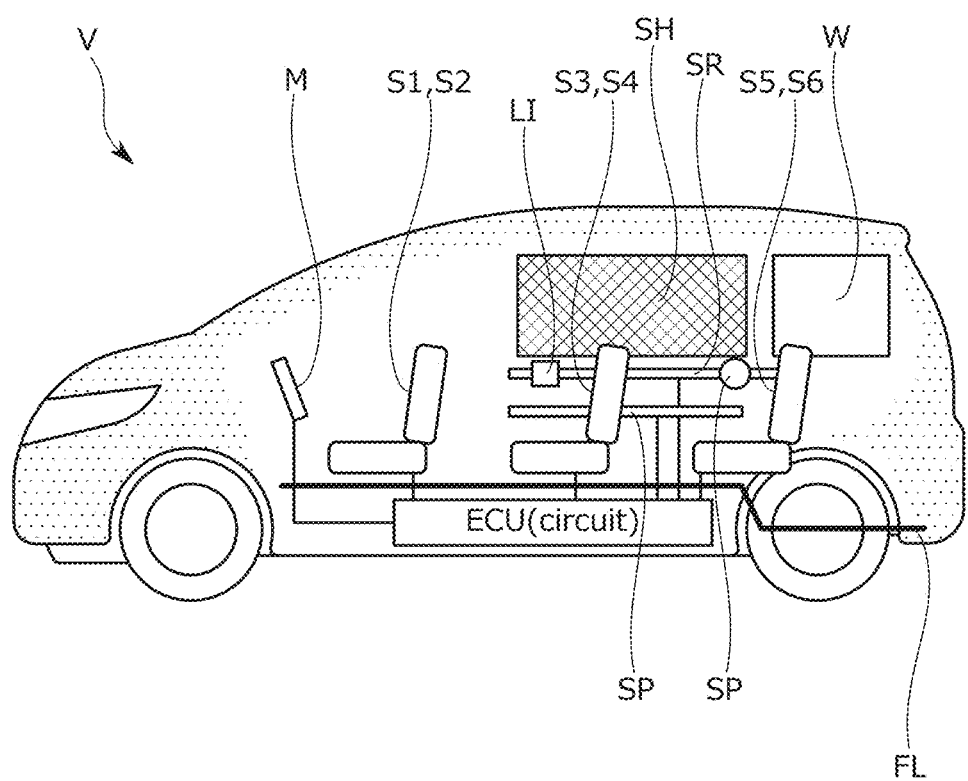
FIG. 6A is an explanatory diagram showing a normal mode.

The vehicle V is a conveyance automobile such as a minivan and as shown in FIG. 6A, a driver seat S1 and an assistant seat S2, MID seats S3 and S4 provided in a second row, and 3rd seats S5 and S6 provided in a third row are arranged in the interior of the vehicle V in order from the front to the back of the vehicle V. In the following description, when the driver seat S1, the assistant seat S2, the MID seats S3 and S4, and the 3rd seats S5 and S6 are not particularly distinguished from each other, they may be collectively referred as the seat S.

Each seat is movable in the front to back direction of the vehicle by the slide rail provided on the floor surface. Further, the MID seats S3 and S4 and the 3rd seats S5 and S6 are foldable, and the cushion and the seat back may be placed in opposite states so that they can be seated backward. A floor FL is provided with a recess capable of accommodating the MID seats S3 and S4 and the 3rd seats S5 and S6. Further, the assistant seat S2 can be in a tip-up state with the cushion flipped up. Further, a shade SH shielding external light is provided on the window of the vehicle door D. The seat S, the shade SH, and the like are connected to a drive device (not shown) for moving each of them and an ECU, and their positions and the like can be adjusted.

A seat arrangement shown in FIG. 6A is a normal mode. The lamp device LI which is the functional component 20 is disposed in front of the MID seats S3 and S4 and the speaker SP is installed in front of the 3rd seats S5 and S6.

Figure 6B:
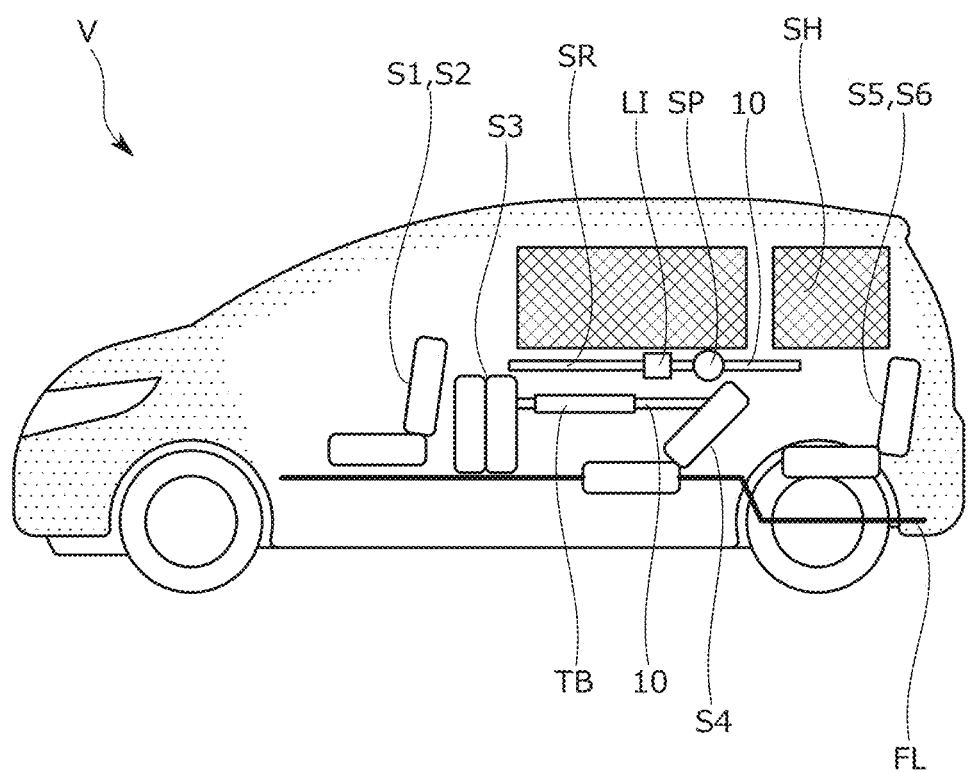
FIG. 6B is an explanatory diagram showing a relaxing and reading mode.

A seat arrangement shown in FIG. 6B is a relaxing and reading mode. One of the MID seats S3 and S4 is folded, the other of the MID seats S3 and S4 is reclined, and the cushion is accommodated in the recess provided in the floor. The 3rd seats S5 and S6 have moved to the rearmost position. The 3rd seats S5 and S6 may be accommodated in the floor FL. The shade SH moves to the upper end of the window W so that the window is blindfolded. The table TB, the lamp device LI, and the speaker SP corresponding to the functional component 20 are arranged in accordance with the positions of the MID seats S3 and S4.

Figure 6C:
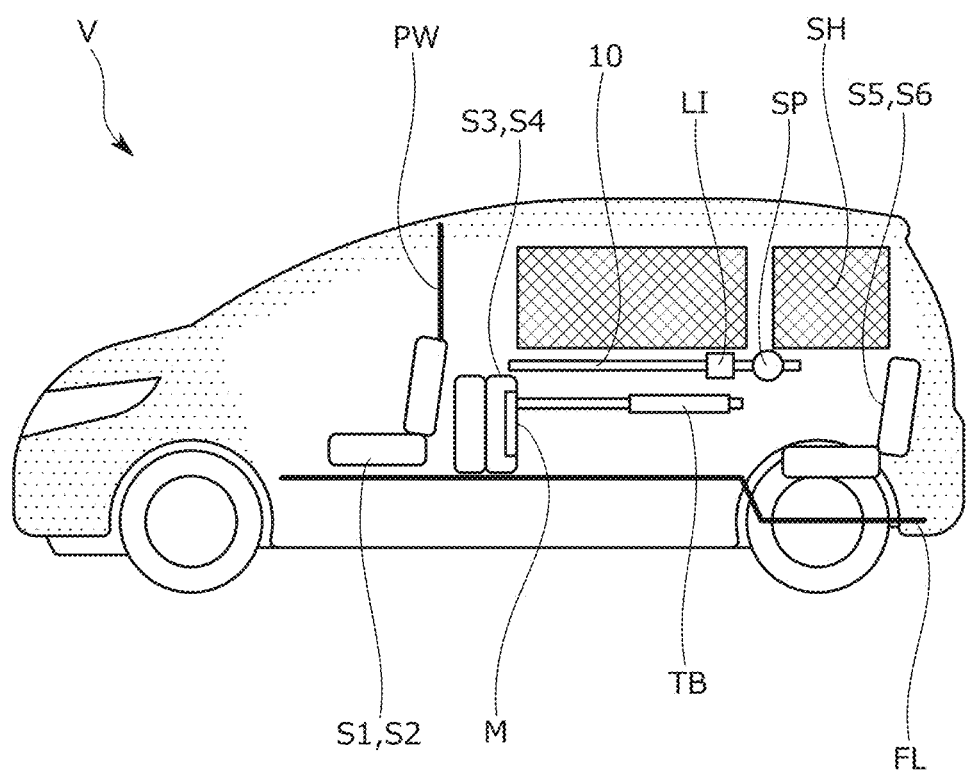
FIG. 6C is an explanatory diagram showing a TV mode.

A seat arrangement shown in FIG. 6C is a TV mode seeing a TV. The MID seats S3 and S4 are folded and moved forward. The 3rd seats S5 and S6 are accommodated in the floor FL, but can be moved up and down in an accommodated state. The shade SH is located at a position to hide the window W. The lamp device LI and the speaker SP are moved in accordance with the positions of the 3rd seats S5 and S6. There is a monitor on the back of the folded MID seats S3 and S4, and the occupants seated on the 3rd seats S5 and S6 can see the image displayed on the monitor M. A partition wall PW is provided between the front seats (the driver seat S1 and the assistant seat S2) and the MID seats S3 and S4 to enable shielding and sound insulation. The table TB, the lamp device LI, and the speaker SP corresponding to the functional component 20 slide on the slide rail (rail member 10) and are installed in the vicinity of the 3rd seats S5 and S6.

Figure 6D:
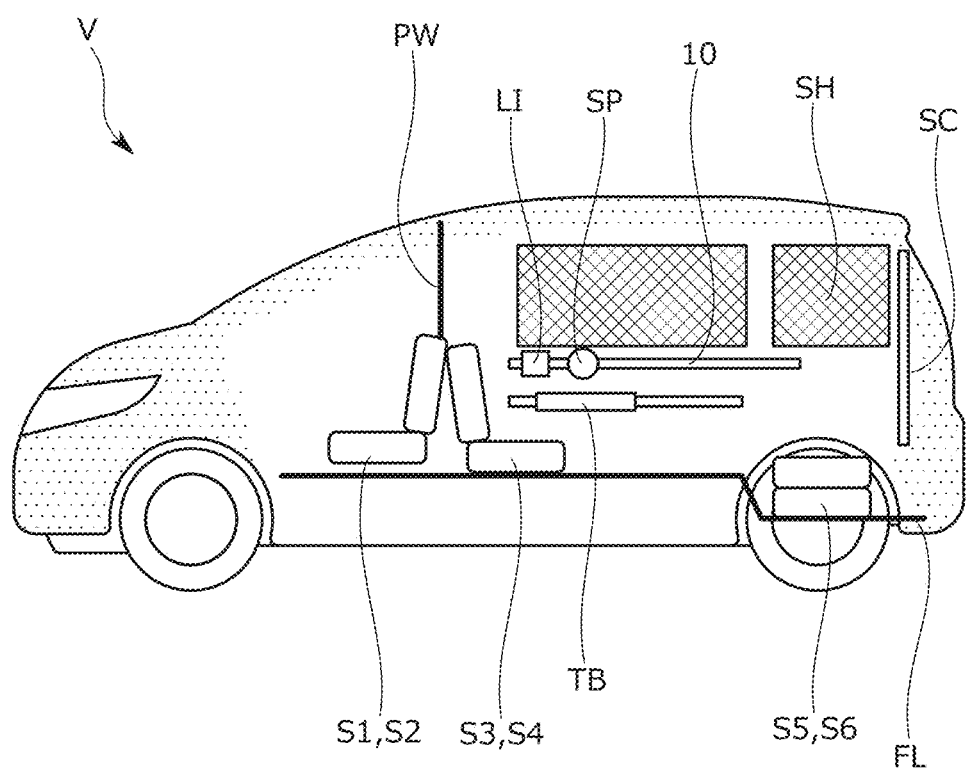
FIG. 6D is an explanatory diagram showing a theater mode.

A seat arrangement shown in FIG. 6D is a theater mode in which an image can be projected on a screen provided on the rear gate (back door) to watch a movie. The 3rd seats S5 and S6 are folded and accommodated in a recess under the floor, and the MID seats S3 and S4 are installed to face backward. The shade SH moves to a position to hide the window W so that the window is blindfolded. The screen SC is attached to the inside of the rear gate RG. A partition wall PW is provided between the front seats (the driver seat and the assistant seat) and the MID seat to enable shielding and sound insulation. The table TB, the lamp device LI, and the speaker SP corresponding to the functional component 20 slide on the slide rail (rail member 10) and are installed in the vicinity of the MID seats S3 and S4.

Figure 6E:
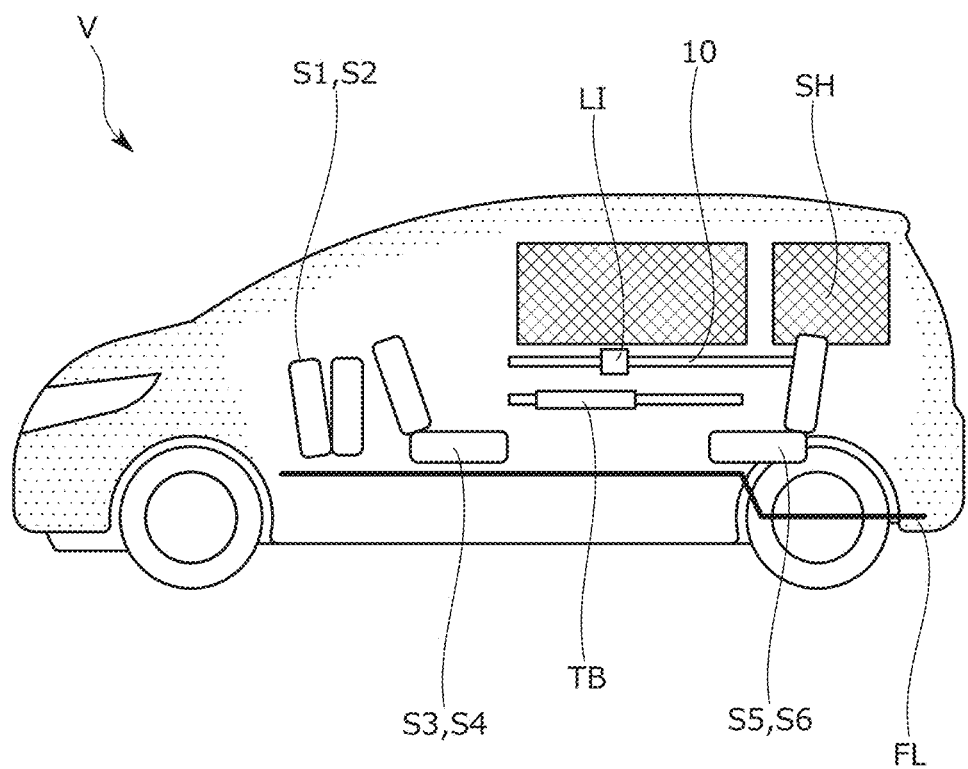
FIG. 6E is an explanatory diagram showing a talk mode.

A seat arrangement shown in FIG. 6E is a talk mode in which the occupants enjoy a conversation. The front seats (the driver seat S1 and the assistant seat S2) are in a tip-up state with the cushion flipped up. The MID seats S3 and S4 are installed to face backward. The shade SH moves to a position to hide the window W so that the window is blindfolded. The table TB and the lamp device LI corresponding to the functional component 20 are arranged between the MID seats S3 and S4 and the 3rd seats S5 and S6 and the occupants sitting on the seats S facing each other can talk to each other.

Figure 6F:
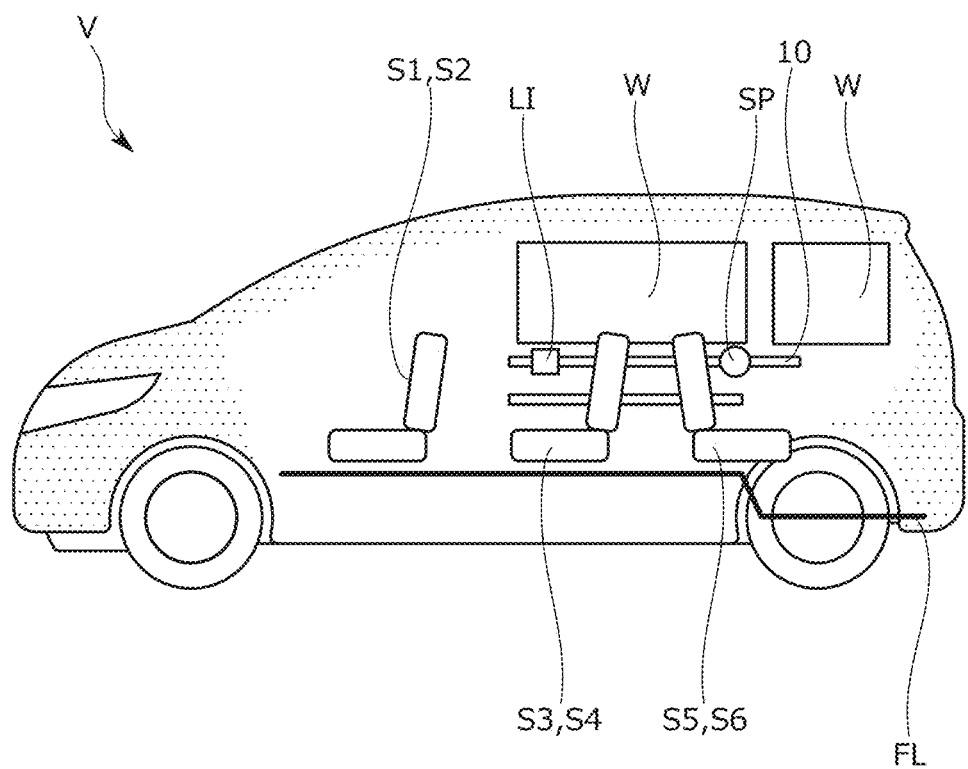
FIG. 6F is an explanatory diagram showing a mode of seeing a scenery.

A seat arrangement shown in FIG. 6F is a mode in which the occupant sees the scenery. The 3rd seats S5 and S6 are installed to face the back side so that the outside scenery can be seen from the window W. The shade SH is lowered and the outside scenery can be seen through the window W. The lamp device LI and the speaker SP corresponding to the functional component 20 are arranged in accordance with the positions of the 3rd seats S5 and S6.

Figure 6G:
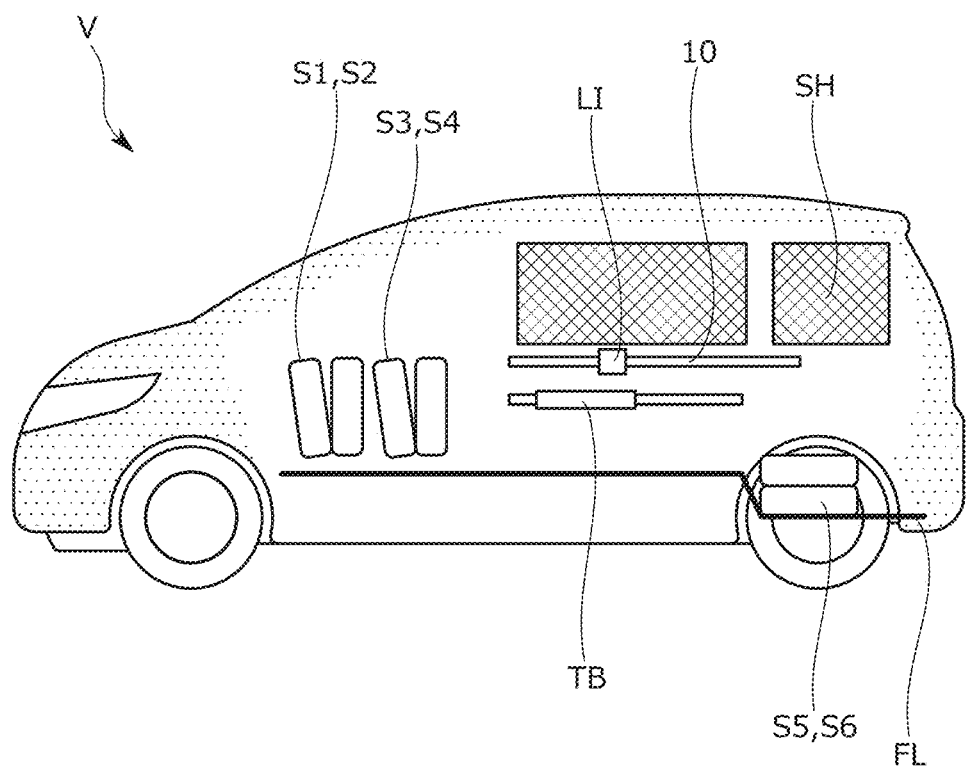
FIG. 6G is an explanatory diagram showing a child room mode.

A seat arrangement shown in FIG. 6G is a child room mode in which children can play. In a state in which the vehicle is parked in the parking lot of the house, the vehicle interior is used as a space for children to play. The front seats (the driver seat and the assistant seat) and the MID seats S3 and S4 are in a tip-up state with the cushion flipped up and moved forward. The 3rd seats S5 and S6 are accommodated in the recess of the floor FL. The shade SH moves to a position to hide the window W so that the window is blindfolded. The floor FL may be provided with a floor mat FM. The table TB and the lamp device LI are arranged by the slide rail SR.

Further, the driver seat S1, the assistant seat S2, the MID seats S3 and S4, and the 3rd seats S5 and S6 mounted on the vehicle V can be removed. A five-seater mode can be used by removing the assistant seat S2.

As described above, the attachment structure for the functional component and the interior member according to the embodiment of the present invention have been described with reference to the drawings. The attachment structure for the functional component is used in a conveyance automobile such as a minivan, but the present invention is not limited to that used in a vehicle mounted on a ground traveling conveyance having wheels such as an automobile or a railroad. For example, the attachment structure can be mounted on an aircraft or a ship that moves outside the ground.

REFERENCE SIGNS LIST

V: vehicle
D: vehicle door
1: door lining (interior member)
3: magnetic field
10: rail member
11: power transmission coil (power transmission unit)
12: side wall
13: slit
20: functional component
21: engagement member
22: engagement member body
23: power receiving coil (power receiving unit)
24: locking piece
25: support portion
26: module attachment portion
27: movable portion
30: module component
SP: speaker
LI: lamp device
CH: hot/cold cup holder
S: seat
  S1: driver seat
  S2: assistant seat
  S3, S4: MID seat
  S5, S6: 3rd seat
W: window
SH: shade
PW: partition wall
SC: screen

The invention claimed is:

1. An attachment structure for a functional component to be attached to an interior member of a conveyance, comprising:
a rail member that is provided in the interior member and extends in a predetermined direction; and
a power transmitter which is provided in the rail member,
wherein the functional component includes an engagement member that is fixed to be slidable on the rail member and a power receiver which is disposed to face the power transmitter of the rail member in the engagement member,
wherein the engagement member includes a movable portion that brings the power receiver located away from the power transmitter closer to the power transmitter when the engagement member is attached to the rail member,
wherein the power transmitter is a power transmission coil and the power receiver is a power receiving coil to supply power in a non-contact state by generating a magnetic field between the power receiving coil and the power transmission coil,
wherein a locking piece is provided at a side portion of the engagement member to be movable in an inward and outward direction of the engagement member and comes into contact with an inner wall of the rail member when the engagement member is attached to the rail member and is rotated,
wherein when the locking piece comes into contact with the inner wall of the rail member, the locking piece is pressed toward the inside of the engagement member, and
wherein when the locking piece is pressed, the movable portion brings the power receiving coil closer to the power transmission coil and the magnetic field is generated between the power receiving coil and the power transmission coil to supply power.

2. The attachment structure for the functional component according to claim 1,
wherein a slit is formed in the extension direction of the rail member, and
wherein the functional component is attached to the rail member when the engagement member is inserted into the slit and is rotated.

3. The attachment structure for the functional component according to claim 1,
wherein the functional component has a module attachment portion provided on the side opposite to the engagement member to attach a module component thereto.

4. The attachment structure for the functional component according to claim 3,
wherein the module component is a component having a lamp function.

5. The attachment structure for the functional component according to claim 3,
wherein the module component is a cup holder having a function of keeping a drink warm or cold.

6. The attachment structure for the functional component according to claim 3,
wherein the module component is a component having a speaker function.

7. The attachment structure for the functional component according to claim 1,
wherein the interior member is a door trim.

8. An interior member, comprising:
the attachment structure for the functional component according to claim 1.

9. The attachment structure for the functional component according to claim 1, wherein a slit is formed in the extension direction of the rail member, and
wherein when the engagement member is rotated, the movable portion brings the power receiver closer to the power transmitter.

10. An attachment structure for a functional component to be attached to an interior member of a conveyance, comprising:
a rail member that is provided in the interior member and extends in a predetermined direction; and
a power transmitter which is provided in the rail member,
wherein the functional component includes an engagement member that is fixed to be slidable on the rail member and a power receiver which is disposed to face the power transmitter of the rail member in the engagement member,
wherein the power transmitter is a power transmission coil and the power receiver is a power receiving coil to supply power in a non-contact state by generating a magnetic field between the power receiving coil and the power transmission coil,
wherein a slit is formed in the extension direction of the rail member,
wherein the functional component is attached to the rail member when the engagement member is inserted into the slit and is rotated, wherein a locking piece is provided at a side portion of the engagement member to be movable in an inward and outward direction of the engagement member and comes into contact with an inner wall of the rail member when the engagement member is attached to the rail member and is rotated, wherein when the locking piece comes into contact with the inner wall of the rail member, the locking piece is pressed toward the inside of the engagement member, and wherein when the locking piece is pressed, the power receiving coil located away from the power transmission coil moves to a position closer to the power transmission coil and the magnetic field is generated between the power receiving coil and the power transmission coil to supply power.

11. The attachment structure for the functional component according to claim 10, wherein the functional component has a module attachment portion provided on the side opposite to the engagement member to attach a module component thereto.

12. The attachment structure for the functional component according to claim 11, wherein the module component is a component having a lamp function.

13. The attachment structure for the functional component according to claim 11, wherein the module component is a cup holder having a function of keeping a drink warm or cold.

14. The attachment structure for the functional component according to claim 11, wherein the module component is a component having a speaker function.

15. The attachment structure for the functional component according to claim 10, wherein the interior member is a door trim.

16. A conveyance, comprising:
the attachment structure for the functional component according to claim 10, and
a plurality of seats and a plurality of door trims,
wherein the rail member is located on the door trim behind the most forward seat of the plurality of seats.

17. A method for manufacturing an attachment structure for a functional component, the method comprising:
attaching a rail member that extends in a predetermined direction and has a power transmitter to an interior member of a conveyance; and
preparing the functional component that has an engagement member that is fixed to be slidable on the rail member and a power receiver which is disposed to face the power transmitter of the rail member in the engagement member,
wherein the power transmitter is a power transmission coil and the power receiver is a power receiving coil to supply power in a non-contact state by generating a magnetic field between the power receiving coil and the power transmission coil,
wherein a slit is formed in the extension direction of the rail member,
wherein the functional component is attached to the rail member when the engagement member is inserted into the slit and is rotated,
wherein a locking piece is provided at a side portion of the engagement member to be movable in an inward and outward direction of the engagement member and comes into contact with an inner wall of the rail member when the engagement member is attached to the rail member and is rotated,
wherein when the locking piece comes into contact with the inner wall of the rail member, the locking piece is pressed toward the inside of the engagement member, and
wherein when the locking piece is pressed, the power receiving coil located away from the power transmission coil moves to a position closer to the power transmission coil and the magnetic field is generated between the power receiving coil and the power transmission coil to supply power.

* * * * *